United States Patent
Tirumalai et al.

(10) Patent No.: US 7,140,010 B2
(45) Date of Patent: Nov. 21, 2006

(54) METHOD AND APPARATUS FOR SIMULTANEOUS OPTIMIZATION OF CODE TARGETING MULTIPLE MACHINES

(75) Inventors: Partha P. Tirumalai, Fremont, CA (US); Mahadevan Rajagopalan, Fremont, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 630 days.

(21) Appl. No.: 09/823,207

(22) Filed: Mar. 30, 2001

(65) Prior Publication Data

US 2002/0144247 A1 Oct. 3, 2002

(51) Int. Cl.
*G06F 9/45* (2006.01)

(52) U.S. Cl. .................. 717/161; 717/151; 717/153

(58) Field of Classification Search ............ 703/13–14, 703/20–22, 27–28; 717/118, 134–135, 138–139, 717/146–148, 151, 153, 161
See application file for complete search history.

(56) References Cited

U.S. PATENT DOCUMENTS

| | | | | |
|---|---|---|---|---|
| 4,667,290 | A | * 5/1987 | Goss et al. ................. | 717/147 |
| 5,493,675 | A | 2/1996 | Faiman, Jr. et al. ........ | 395/700 |
| 5,586,323 | A | * 12/1996 | Koizumi et al. ............ | 717/174 |
| 5,887,169 | A | * 3/1999 | Lacombe .................... | 719/311 |
| 6,078,744 | A | 6/2000 | Wolezko et al. ............ | 395/705 |
| 6,226,790 | B1 | * 5/2001 | Wolf et al. ................. | 717/135 |
| 6,289,505 | B1 | 9/2001 | Goebel .......................... | 717/9 |
| 6,292,938 | B1 | 9/2001 | Sarkar et al. ................. | 717/6 |
| 6,295,643 | B1 | 9/2001 | Brown et al. ................. | 717/9 |

OTHER PUBLICATIONS

Lopes et al.; "The YAIL: An Intermediate Language for the Native Compilation of Prolog Programs"; LIACC, Universidade do Porto; Oct. 22, 1996, pp. 1-14.*
Mathur, Neeraj; "'Java'—Man, Not Again"; Learning Java; Sep. 9, 2001.*
Aho et al.; "Compilers: Principles, Techniques, and Tools"; Addison, Wesley, Longman; 1986; pp. 1-23 and 463-465.*
Sun Turns Ultraparc-II Microprocessors up to 360 MHz; Sun Microsystems Press Release May 1998. pp. 1-2.*
"UltraSPARC-III: Designing Third-Generation 64-Bit Performance"; IEEE 1999; pp. 73-85.*
T. Williams, "Compiler Technology Tracks CPU Architecture Headway", *Embedded Systems Development*, pp. 41-45, Aug. 2000.

* cited by examiner

*Primary Examiner*—Kakali Chaki
*Assistant Examiner*—William H. Wood
(74) *Attorney, Agent, or Firm*—Martine Penilla & Gencarella, LLP (57) ABSTRACT

Method and apparatus for simultaneous optimization of the compiler to generate codes that may be compatible and acceptable for two or more different processors without potentially sacrificing the performance on any processors is provided. In particular, the rules of instructions scheduling for the machines of interest of different processors are abstracted. From the abstractions, a hypothetical machine is generated that is the restrictive or constraining set of the actual machines modeled in the abstraction step. After generating the hypothetical machine, the restricted hypothetical machine is targeted rather than the actual machines modeled in the first step. Thereafter, conflicts, if any are resolved by modeling the performance impact and selecting the less damaging choice. In this manner, by creating a hypothetical machine model which incorporates the features of all target machines of interest and which is more restrictive or constrained that the actual machines modeled, it is possible to simultaneously optimize the code targeting multiple machines.

17 Claims, 4 Drawing Sheets

METHOD AND APPARATUS FOR SIMULTANEOUS OPTIMIZATION OF CODE TARGETING MULTIPLE MACHINES

BACKGROUND OF THE INVENTION

1. Field of the Invention

The present invention relates to compilers for microelectronics in integrated circuits. More particularly, the present invention relates to method and apparatus for simultaneously optimizing compiler's attempt to generate efficient code for multiple target machines.

2. Description of the Related Art

The backend of compilers for a target machine performs operations such as instruction scheduling, register allocation and other related tasks using a model of the target processor. The general goal of the algorithms and techniques employed is to generate code that executes quickly on the modeled target machine.

In real world applications, technical advances in processor technology generally rises with time. Computer manufacturers take advantage of new technology, periodically offering new systems that are faster but functionally compatible with their previous generation models. As customers gradually upgrade and transition to the newer, later available systems, most installations generally contain systems built with both old and new processors at any given time. The installation of the newer systems generally require compatible computer software that operates on all of the machines available including both the latest generation as well as the prior versions.

In such an environment, computer code optimization targeting a particular processor, while adequate for one target machine (for example, target machine P), may not be satisfactory for another target machine (for example, target machine N), and vice versa. This leads to customers being forced to select machines for which they wish to obtain optimal code, while potentially sacrificing the performance of other existing machines on their floor.

In particular, in the case of the two target machines P and N above with two generation of processors, a previous version P (of target machine P) and a newer version of the processor N (of target machine N), trends over the past several years in processor technology indicate increasing CPU clock frequencies. For example, processor P may be configured to operate in the 300–600 MHz clock frequency range, while processor N may be configured to operate in the 750–1000 MHz clock frequency range. At the higher clock rate, for example, the newer processor N generally takes more processor cycles to complete an operation such as a floating point addition as compared with the processor P operating at a relatively lower clock rate. In such cases, the optimizing compiler is generally required to generate code that is sufficient to operate around the increased latency of operations and to maintain high CPU utilization.

A typical machine model includes a latency table and a resource usage table. Latency here generally refers to the length of time duration necessary for a given operation to complete from a starting point to when the results of the given operation is available, and is measured in the number of processor cycles.

Generally, a computer processor speed is measured in terms of frequency such as MHz and so on. For a 400 MHz processor, the 400 MHz refers to the clock frequency of the processor whose one cycle is equal to $1/(400*10^6)$ seconds, which is the same as $(1/400)*10^{-6}$ seconds. In multiple stages of a CPU pipeline, one cycle is can be viewed as the time given to a particular stage of the pipeline to perform the necessary operations at that stage. Here, pipeline of the CPU generally refers to the number of instruction execution stages for the particular CPU.

In the event that the processor speed is increased, for example, from 400 MHz to 600 MHz, it can be seen that the time available to each stage in the pipeline decreases, but the total amount of operations and necessary functions remain the same. Thus, in one approach, the number of stages in the pipeline architecture can be increased to ensure that all operations can be performed to completion.

Generally, an instruction is mapped to a latency class, and each processor may have a different number of latency classes with different latencies. In other words, for a given data producer such as a floating point adding instruction (Fadd), it is determined to what latency class the data producer belongs, and the determined latency class is mapped to the latency class of the data consumer such as a floating point multiplication instruction (Fmul). After mapping the latency class of the data producer to that of the data consumer, a corresponding source and destination latency class can be looked up from the latency table to obtain the number of cycles for the particular processor. In the example given above, the destination latency class is the floating point multiplication instruction (Fmul) while the source latency class is the floating point addition instruction (Fadd). In this manner, by mapping the destination latency class with the source latency class for a given processor, the look up latency table can be generated.

Referring again to the machine model referenced above, each instruction set is further mapped into a class called a resource usage class. Different instructions can be mapped to the same resource usage class. Resource usage class contains information related to the processor resources used by the particular instruction over time. For example, for each resource, there is provided a number of a particular resource that is used by a particular instruction. In specific, a given resource can be called once or on multiple occasions.

For a particular instruction to be scheduled, all its input data should be available. That is, the data producers should make the necessary data available to the data consumer, and further, all the resources that the data consumer needs should be available. In other words, all the resources that the data consumer needs to execute the necessary operations should be available. Otherwise, for a given processing cycle, the data consumer will be unable to execute its predetermined operations.

SUMMARY OF THE INVENTION

In view of the foregoing, in accordance with the present invention, the computer code targeting multiple machines is simultaneously optimized by striking a middle ground where no machine is targeted to the exclusion of the other.

In particular, a method of optimizing at least two target machines, comprising the steps of abstracting a rule of instruction scheduling for each of said at least two target machines, generating a hypothetical machine based on said rule of instructions, targeting said hypothetical machine. Further, a rule of instruction scheduling for the hypothetical machine may be a restrictive set of the abstracted rules of instruction scheduling of the at least two target machines.

Additionally, in one aspect, the method may further include the steps of detecting a conflict between said abstracted rules of instructions, resolving said conflict. Moreover, the step of resolving the conflict may include the step selecting the less damaging option of the detected conflict. Furthermore, the detected conflict may correspond to a conflict between a rule of instruction of one of the at least two target machines and a rule of instruction of another of the at least two target machines.

In a further aspect, the method may additionally include the steps of modeling each of said at least two target machines and retrieving scheduling information corresponding to each of said at least two target machines. Moreover, the at least two target machines may include an UltraSPARC®-II configured to operate at a speed of 360 MHz and an UltraSPARC®-III configured to operate at a speed of 600 MHz.

A method of optimizing at least two target machines in accordance with another embodiment of the present invention includes the steps of retrieving scheduling information corresponding to each of said at least two target machines, abstracting a rule of instruction scheduling for each of said at least two target machines, generating a hypothetical machine based on said rule of instructions, and targeting said hypothetical machine.

The method may further include the steps of detecting a conflict between said abstracted rules of instructions, resolving said conflict. Moreover, a rule of instruction scheduling for the hypothetical machine may be a restrictive set of the abstracted rules of instruction scheduling of the at least two target machines. The step of resolving the conflict may include the step selecting the less damaging option of the detected conflict. Additionally, the detected conflict may correspond to a conflict between a rule of instruction of one of the at least two target machines and a rule of instruction of another of the at least two target machines.

An apparatus for optimizing at least two target machines in accordance with yet another embodiment of the present invention includes, means for abstracting a rule of instruction scheduling for each of said at least two target machines, means for generating a hypothetical machine based on said rule of instructions, and means for targeting said hypothetical machine.

In one aspect, a rule of instruction scheduling for the hypothetical machine may be a restrictive set of said abstracted rules of instruction scheduling of said at least two target machines. Additionally, the apparatus may further include means for detecting a conflict between said abstracted rules of instructions, and means for resolving said conflict. Furthermore, the resolving means may include means for selecting the less damaging option of said detected conflict, while the detected conflict may correspond to a conflict between a rule of instruction of one of the at least two target machines and a rule of instruction of another of the at least two target machines. Moreover, in a further aspect, the apparatus may additionally include means for modeling each of said at least two target machines, and means for retrieving scheduling information corresponding to each of said at least two target machines.

An apparatus for optimizing at least two target machines in accordance with still another embodiment of the present invention includes means for retrieving scheduling information corresponding to each of the at least two target machines, means for abstracting a rule of instruction scheduling for each of the at least two target machines, means for generating a hypothetical machine based on the rule of instructions, and means for targeting the hypothetical machine.

An apparatus for optimizing a plurality of target machines in accordance with further yet another embodiment of the present invention includes means for modeling a plurality of target machines, means for retrieving scheduling information corresponding to each of the plurality of target machines, means for abstracting a rule of instruction scheduling for each of the plurality of target machines, means for generating a hypothetical machine based on the rule of instructions, means for targeting the hypothetical machine, means for detecting a conflict between the abstracted rules of instructions, and means for resolving the conflict.

In the case where there are two different processors with different operating frequencies such as a 400 MHz machine and a 600 MHz machine, as discussed above, the clock rates of these two processors will differ, the number of stages in the corresponding CPU pipelines as well as the latencies for each processor differ. Thus, the machine model for these two different speed machines will be different. In other words, the machine model for the 400 MHz machine is configured to address the operating requirements of the 400 MHz machine, while the machine model for the 600 MHz machine is configured to address the operating requirements of the 600 MHz machine. However, there is no single machine model that is configured to address the operating requirements of both machines operating at different speeds.

As such, a binary code designed and compiled for the 600 MHz machine will operate as intended on the 600 MHz machine. However, the same binary code may not work as well as it could on the 400 MHz machine, and in some instances, may actually result in a performance deterioration in the 400 MHz machine. In other words, running a binary code compiled for the 600 MHz machine on the 400 MHz machine, without recompiling for the 400 MHz machine, may not work as well as running a binary code on the 400 MHz machine that was specifically compiled for the 400 MHz machine.

Indeed, in accordance with the present invention, compatible, functionally acceptable code is simultaneously generated for targeting multiple machines each configured with different operating conditions such that performance on any target machine of the multiple targeted machines is not potentially sacrificed.

These and other features and advantages of the present invention will be understood upon consideration of the following detailed description of the invention and the accompanying drawings.

DESCRIPTION OF THE PREFERRED EMBODIMENT

Figure 1:
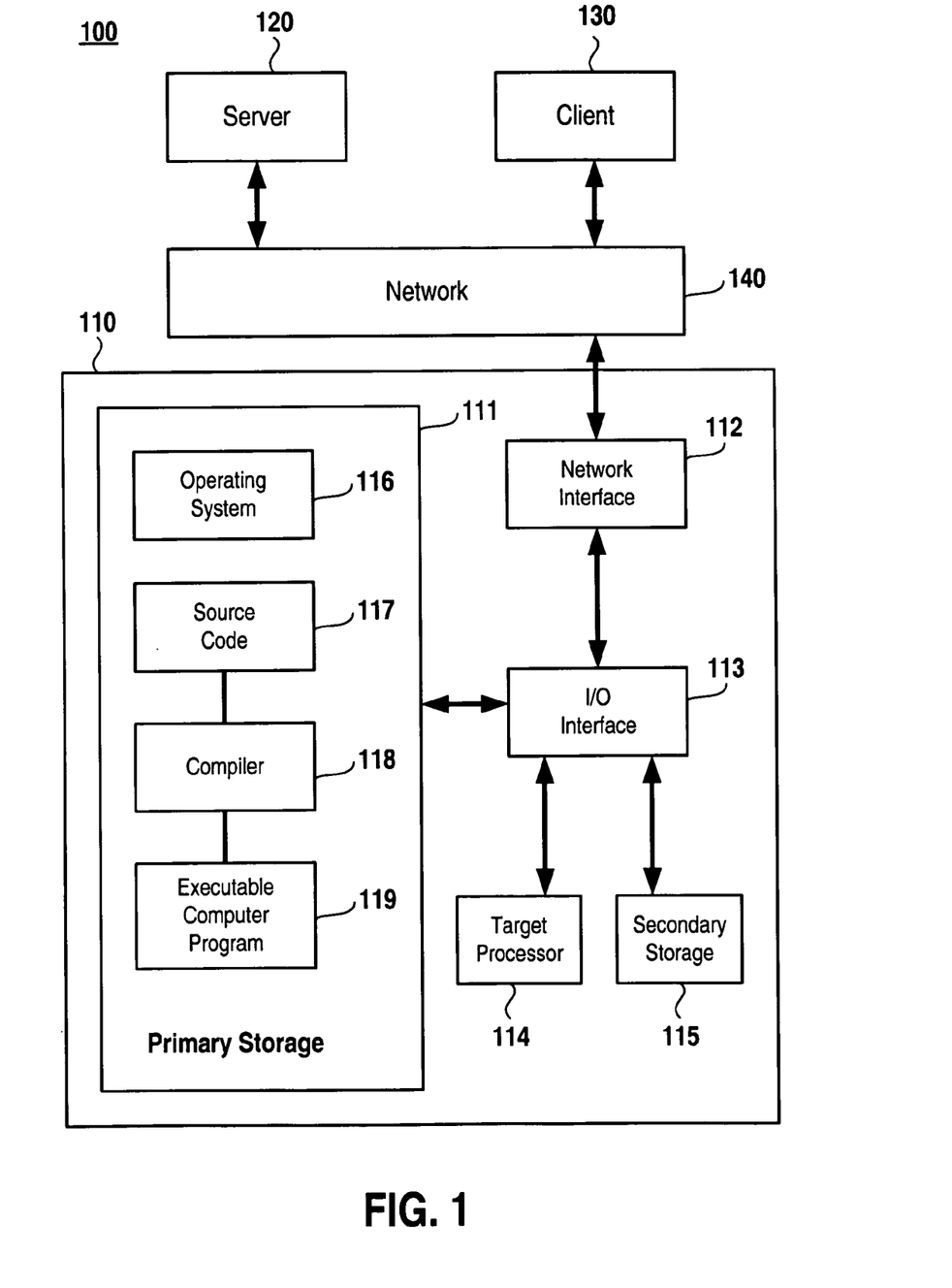
FIG. 1 illustrates a computer network connecting a server terminal and various client terminals to practice one embodiment of the present invention.

FIG. 1 illustrates a computer network 100 to practice one embodiment of the present invention. As shown, in the computer network 100, there is provided server computer systems 110 and 120 configured to communicate with a client computer system or terminal 130 over a network 140. In one embodiment, the client and server computer systems connected to the network 140 transmit and receive data and other information using TCP/IP protocol or other available protocols. Other network protocols for server-client communications may include SNA, X.25, Novell Netware, Vines, or Appletalk.

In further detail, as shown in FIG. 1, server 110 includes a primary storage 111, a network interface 112, an input/output (I/O) interface 113, a processor 114, and a secondary storage 115. The I/O interface 113 is configured to facilitate communication between these various components. Network interface 112 is configured to couple the server 110 to the network 140 and facilitate communication between the server 110 and other computer systems such as the server 120 and the client system 130 on the network.

Typically, the target processor 114 in the server 110 is configured to fetch computer instructions from the primary storage 111 through the I/O interface 113. After retrieving these instructions, the target processor 114 executes these computer instructions, which enables the target processor 114 to retrieve data or write data to the primary storage 111, the secondary storage 115, display information on one or more computer display terminals (not shown), receive command signals from one or more input devices (not shown), or retrieve data or write data to other computer systems connected to the network 140. The primary storage 111 and the secondary storage 115 can include any type of computer storage devices including, but not limited to, random access memory (RAM), read-only memory (ROM), application specific integrated circuits (ASIC), and storage devices which include magnetic and/or optical storage media such as CD-ROM and so on.

In one aspect of the present invention, the target processor 114 can include any of the SPARC compatible processors, UltraSPARC® compatible processors, or Java compatible processors available from Sun Microsystems, Inc., of Mountain View, Calif. Alternatively, the target processor 114 can be based on PowerPC processor available from Apple, Inc., of Cupertino, Calif. or any of the Pentium or x86 compatible processors available from Intel Corporation, AMD and Cyrix Corporation.

The primary storage 111 may include an operating system 116 configured to manage the computer resources. In one aspect of the present invention, the operating system 116 may be the Solaris operating system or any other multitasking, multi-user operating system with the support for object oriented programming languages such as Java® programming language, or high level programming language such as C, C++, or Fortran. Further shown in the primary storage 111 of FIG. 1 is a source code 117 which can include, for example, the source code of a Java application, and a compiler 118 for generating executable computer programs 119.

Figure 2:
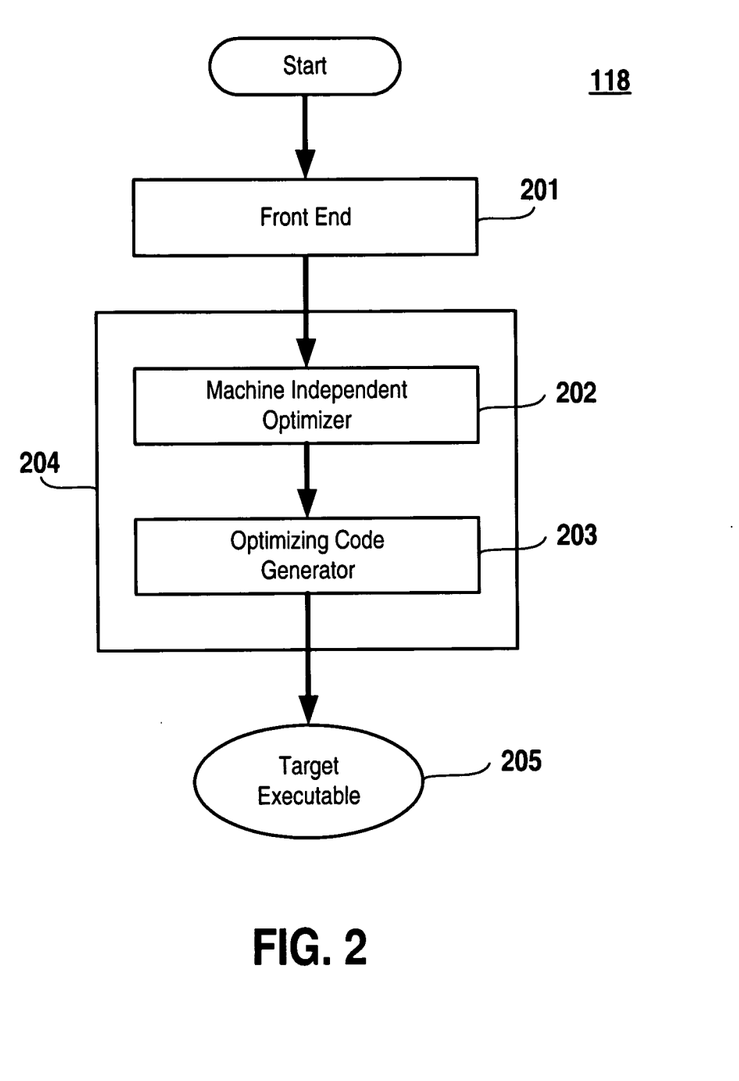
FIG. 2 is a flowchart illustrating the overall processing of a compiler in accordance with one embodiment of the present invention.

FIG. 2 is a flowchart illustrating the overall processing performed by the compiler 118 shown in FIG. 1 in accordance with one embodiment of the present invention. Referring to FIG. 2, the compiler 118 typically includes a front end 201, a machine independent optimizer 202, and an optimizing code generator 203, the machine independent optimizer 202 and the optimizing code generator 203 comprising a backend 204. A source code for a computer program is generated by a user and provided to the front end 201 of the compiler 118 where various pre-processing operations are performed. Thereafter, the source code is provided to the machine independent optimizer 202 which may be configured to perform various machine independent optimizations expressed in an intermediate code which is semantically equivalent to the source code. The intermediate code may be expressed in a machine-independent format. Then, the optimizing code generator 203 receives the intermediate code from the machine independent optimizer 202 and performs various transformations to schedule the instruction set in a faster and a more efficient manner on the target machines.

Referring back to FIG. 2, the backend 204 may be configured to accept the intermediate code and generate a target executable 205 for execution on the target processor 114 which may include a set of machine instructions in binary format which can be executed on a specific target machine such as SPARC, Intel, PowerPC or MIPS. Each machine instruction may include an operation code (opcode) portion and an operand portion containing one or more operands. The opcode portion of the machine instruction may be configured to instruct the target machine to execute the specific functions, while the operand portion of the instruction is used to locate data stored in a combination of registers or memory available during execution.

In one aspect, the optimization may be directed to improving the code based upon the target processor used to execute the code. Generally, the optimizing code generator 203 is used if a user desires an executable to take advantage of specific hardware features unique to a particular hardware platform. In particular, the use of the optimizing code generator 203 may improve the execution efficiency of an executable and increases the effective processing throughput of the hardware platform.

Figure 3:
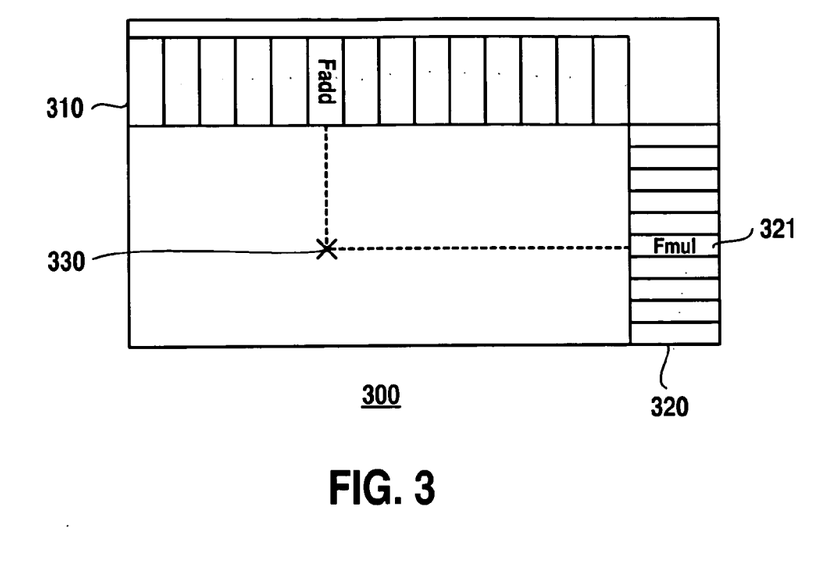
FIG. 3 illustrates a latency table for a particular machine model in accordance with one embodiment of the present invention.

FIG. 3 illustrates a latency table for a particular machine model in accordance with one embodiment of the present invention. Referring to FIG. 3, latency table 300 is provided with row entries correspond to source latency class 310 and column entries corresponding to the destination latency class 320. For example, the source latency class 310 may include data producers such as a floating point addition instruction (Fadd) 311, while the destination latency class 320 may include data consumers such as floating point multiplication instruction (Fmul) 321. Moreover, the intersecting point 330 in the latency table 300 where the data producer (for example, Fadd 311) and the data consumer (Fmul 321) meet provides the latency (or the number of cycles) for the particular instruction to complete its operation for a given processor.

Figure 4:
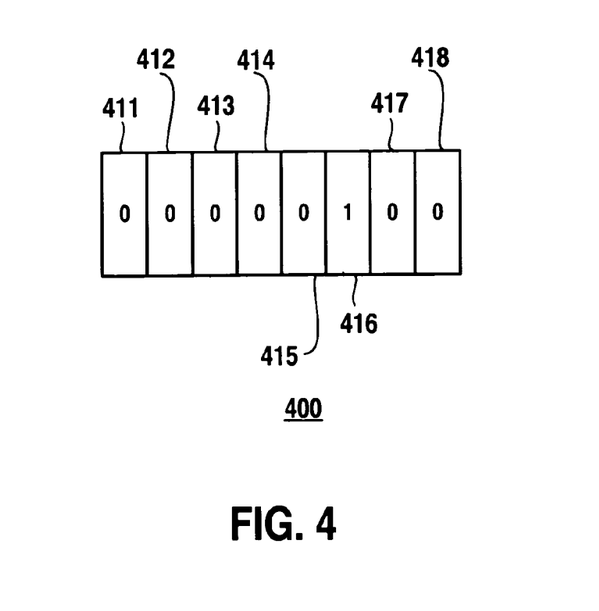
FIG. 4 illustrates a resource usage table for a given instruction for the particular machine model of FIG. 3 in accordance with one embodiment of the present invention.

FIG. 4 illustrates a resource usage table for a given instruction for the particular machine model of FIG. 3 in accordance with one embodiment of the present invention. Referring to FIG. 4, the resource usage table 400 may include a plurality of columns 411, 412, 413, 414, 415, 416, 417, 418. In particular, depending upon the particular instruction for the resource usage table 400, it can be seen that the various columns 411, 412, 413, 414, 415, 416, 417, 418 each corresponding to a particular resource, may have a "1" identifier or a "0" identifier. For example, in the case of floating point addition instruction (Fadd), it can be seen from FIG. 4 that column 416 which corresponds to floating point addition instruction (Fadd) has a "1" identifier, while the remaining columns 411, 412, 413, 414, 415, 417, and 418 each have a "0" identifier indicating that the resources in these other remaining columns 411, 412, 413, 414, 415, 417, and 418 of the resource usage table 400 are not for the floating point addition instruction (Fadd). In this manner, it is possible to map an instruction (such as, for example, the floating point addition instruction (Fadd)) to a resource usage class, and from the resource usage class, it can be determined which resources are used for the particular instruction.

Figure 5:
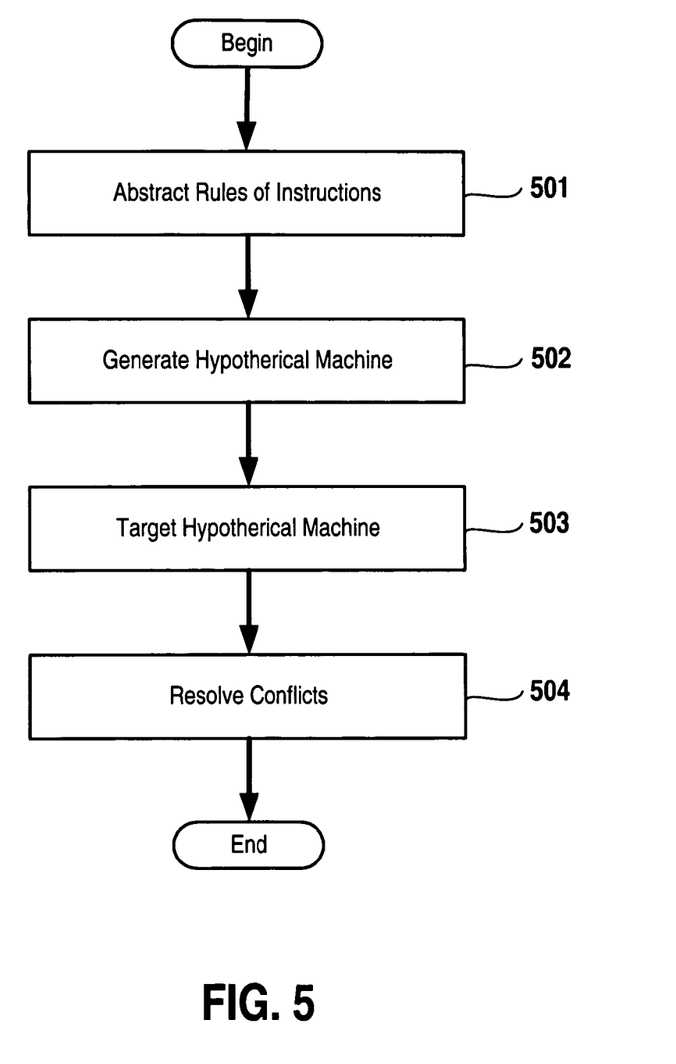
FIG. 5 is a flowchart illustrating the simultaneous optimization of code targeting multiple machines in accordance with one embodiment of the present invention.

FIG. 5 is a flow chart for illustrating simultaneous optimization of code targeting multiple machines in accordance with one embodiment of the present invention. Referring to FIG. 5, at step 501, the rules of instructions scheduling for the machines of interest are abstracted. With the result of abstracted rules of instructions, at step 502, a hypothetical machine is generated that is the restrictive or constraining set of the actual machines modeled at step 501. After the hypothetical machine is generated at step 502 based on abstracted rules of instructions which is a more restrictive set than the actual target machines, at step 503 the hypothetical machine is targeted rather than the actual target machines. If any conflicts exist, at step 504 these conflicts are resolved by modeling the performance impact and selecting the less damaging choice, and the procedure ends.

In this manner, by creating a hypothetical machine model which incorporates the features of all target machines of interest which is more restrictive or constrained than the actual machines modeled after resolving any conflicts by modeling the performance impact and selecting the less damaging choice, it is possible to provide a compiler design to simultaneously optimize the code targeting multiple machines.

For example, consider a customer who wishes to transition from an older generation processor UltraSPARC®-II (for example, target machine P) operating at a speed of 360 MHz to a newer or next generation processor UltraSPARC®-III (for example, target machine N) configured to operate at a speed of 600 MHz. Further assume that the customer already has a system based on UltraSPARC®-II as well as a system based on UltraSPARC®-III. The desired outcome is to obtain a given binary to run efficiently both in the system with the next generation processor UltraSPARC®-III and in the system with the current generation processor UltraSPARC®-II. Since these are two different processors, two different machine models can be ascertained.

While both UltraSPARC®-II and UltraSPARC®-III processors are SPARC V9, and thus have the same number of architecturally visible registers, UltraSPARC®-II processor is designed to operate at lower clock rates as compared to its next generation processor UltraSPARC®-III, and therefore, UltraSPARC®-II processor only requires three CPU cycles to perform instructions such as a floating point addition or multiplication. It should be noted here that SPARC V9 refers to the architecture specification from SPARC International which, among others, sets the specification for a central processing unit (CPU) for a SPARC machine.

In contrast, UltraSPARC-III processor requires four CPU cycles to perform a floating point addition or multiplication operation. Additionally, UltraSPARC®-II processor is configured with a load buffer which allows pipelining of loads even if they miss the L1 data cache, while UltraSPARC®-III processor has a blocking L1 data cache. That is, there is no pipelining of loads that miss the cache in the system with the next generation processor UltraSPARC®-III. Rather, UltraSPARC®-III processor implements a prefetch operation which is generally a preferred mechanism for high clock designs. In other words, a prefetch instruction is sent to the CPU in the UltraSPARC®-III system a predetermined number of clocks before a particular load to move the necessary data for the particular load closer to the CPU for execution. It should be noted here that loads refer to the instructions provided to the CPU for execution, and generally includes an address expression and destination information.

Therefore, it can be seen that in the system with the current generation processor UltraSPARC®-II, the pipeline includes less number of stages, and thus, its latency is smaller and has less cycles, while the system embodying the next generation processor UltraSPARC®-III requires comparatively more stages in the pipeline and thus has a larger latency.

In the system with the UltraSPARC®-III processor, if the L1 data cache is missed in a given cycle, the processor stalls. In contrast, in the system with the UltraSPARC®-II processor, even if L1 data cache is missed, it is pipelined and the next load can proceed in such pipelined fashion up to eight (8) loads in this manner.

Given the above, the hypothetical machine model in accordance with the present invention is designed to incorporate the characteristics of the two systems having different processors such that the hypothetical machine model will operate satisfactorily on both systems.

In particular, for the hypothetical machine model, it can be seen that either L1 data cache (on-chip cache) or L2 data cache (external cache) can be scheduled. Since there is no disadvantage to scheduling L2 data cache for the next generation processor UltraSPARC®-III given that when L1 data cache is missed, the processor stalls and the processor implements a prefetch operation as discussed above, and since the system using the current generation processor UltraSPARC®-II relies upon L2 data cache when L1 data cache is missed, it can be observed that by scheduling for L2 data cache for the hypothetical machine model, there is no significant disadvantage to the system with the next generation processor UltraSPARC®-III while the operational performance can be maintained for the system with the current generation processor UltraSPARC®-II. In other words, in the system with the current generation processor, it is simply assumed that L1 data cache is going to be missed, and thus scheduled for L2 data cache. In view of the foregoing, it can be seen that for the hypothetical machine model L2 data cache should be scheduled.

Furthermore, it can be observed that the instructions such as floating point multiplication instruction (Fmul) and floating point addition instruction (Fadd) cannot be performed in less than four cycle latency in the system with the next generation processor UltraSPARC®-III. On the other hand, it can be observed that in the system with the current generation processor UltraSPARC®-II, using four latency cycles (rather than three cycles) does not significantly impact its operations other than that the life time for the registers that are dedicated to the particular operations may be longer. Thus, it can be seen that, for the hypothetical machine model, it is desirable to use four cycle latency.

It is important to recognize that, for scheduling, data as well as the resources should be available for the instruction. The availability of data is determined by latency such as uploads, floating point operations and so on, such that the data source need not simply be the load, but can also include other operations such as the floating point addition instruction (Fadd).

For example, consider the following single loop operation.

$$\Phi i=1, 50000$$

$$z(i)=x(i)+y(i).$$

end Φ
   Then,
     load x(i)
     load y(i)
     Fadd x(i)+y(i)→temp
     Store temp, z(i)

where the two loads, load x(i) and load y(i), are data sources, while the floating point addition instruction (Fadd) is the data consumer. In other words, with load x(i) and load y(i) loaded from memory, the floating point addition instruction (Fadd) is performed on the data brought in by the two loads (load x(i) and load(y)) and temporarily stored (temp), the result then being stored in a data file.

The load latency is the same for load x(i) and load y(i), and is between the respective loads and the addition operation. Thus, the latency for the data source load x(i), load y(i) and the data consumer Fadd is looped up, such that, if load x(i) is scheduled for the first cycle and load y(i) is scheduled for the second cycle, then the earliest the data consumer Fadd can be scheduled is in the tenth cycle ten, since eight is the latency that was determined in the latency table. Since only one load can be executed per each cycle, there is greater than eight (8) cycle latency between data source load x(i) and data consumer Fadd, and an eight (8) cycle latency between data source load y(i) and data consumer Fadd.

Therefore, in the hypothetical machine model, it can be determined that using a load latency and scheduling for L2 data cache as well as using a floating point latency of four cycles would be desirable, to provide operational compatibility for the two processors without the potential for performance sacrifice. In particular, using the load latency and scheduling for the L2 data cache addresses the operating requirements of the current generation processor UltraSPARC-II while, using the floating point latency of four cycles addresses the operating requirements for the next generation processor UltraSPARC®-III.

As a numerical example, when the short program above was compiled using the next generation processor UltraSPARC®-III, it required 18.7 seconds while when the same binary processed on the current generation processor UltraSPARC®-II required 51 seconds. The poor result on the current generation processor UltraSPARC®-II is a result of not scheduling for the L2 data cache (but rather, for L1 data cache) since, as discussed above, scheduling for L2 data cache is not useful for the next generation processor UltraSPARC®-III.

Thus, the load latency was just three cycles, but that three cycle latency was insufficient for the current generation processor UltraSPARC®-II since longer latency is necessary to schedule for L2 data cache. As a result, by running the same binary that was compiled for the next generation processor UltraSPARC®-III on the current generation processor UltraSPARC®-II, a performance deterioration on the current generation processor UltraSPARC®-II results.

By contrast, when the same short program above was compiled using the hypothetical machine model, the next generation processor UltraSPARC®-III, it required 17.9 seconds, while that for the current generation processor UltraSPARC®-II was 29.9 seconds. It can be seen that, by using the hypothetical machine model, while the performance of the next generation processor UltraSPARC®-III was sustained, a considerable improvement in the performance of the current generation processor UltraSPARC®-II resulted. It should be noted that the minor improvement in the performance of the next generation processor UltraSPARC®-III is in the noise range, thus while not a deterioration, is, if any, only a slight improvement.

In this manner, in accordance with the present invention using a hypothetical machine model, for each machine, it is first determined what is important for that machine, that is, what distinguishes that particular processor from other processors in other machines in consideration. For example, in the case of the above, for the system with the current generation processor UltraSPARC®-II, it is determined that L2 data cache is important and further, that the L2 data cache does not impact the operational performance in the system with the next generation processor UltraSPARC®-III, but rather, it is redundant for the system with the next generation processor. Furthermore, using four cycles for floating point latency provides operational compatibility for the two processors without the potential for performance sacrifice. It can be seen that the instructions essentially determine the important features for each machine in generating the hypothetical machine model.

Additionally, on the floating point side, the performance is mainly determined by floating point load, and the floating point addition and multiplication instructions. One property of programs that are characterized by floating point operations is that the L1 data cache is not triggered. On the other hand, for simple integer operations, it is not advantageous to schedule for L2 data cache, and is more likely to trigger L1 data cache.

As can be seen from the above, the present invention seeks to address the constraints imposed by at least two different types of machines, in a strict sense, involving latency, blocking versus pipelining, and so on. Typically in the architecture design, subsequent generation of processor design moves to a higher clock rate, and one approach to designing a processor to run faster is to provide deeper CPU pipelining (i.e., more pipeline stages). The processor then takes more clock cycles, that is, the clock rate is higher such that, for example, while a 500 MHz processor may usually take three (3) processor clocks to accomplish a particular task, but at 200 MHz, because each clock is larger by 5 nanoseconds, the same task may be achieved in 2 clocks. Thus, as the clock rate is pushed up, the latency of the operation in terms of CPU clock tends to increase.

In an example of a given two generation of processors, generally, the more recent generation has higher latency than the previous one, and certain tasks that the CPU has to perform, such as buffering and keeping tracks of data and so on, because of the increased latency, may result in further complication. For instance, due to latency, there may result in additional instructions for processing by the CPU in the later generation processor such that in designing the CPU for the later generation processor, certain trade-offs need be made, and operations and processes that was performed in three clock cycles, may, in the new design, require four clock cycles.

From an implementation perspective, the present invention addresses latency, register pressure (generally, a higher latency tends to push the register pressure up), and the blocking nature of the load. For example, the instruction schedule in the optimizing compiler has to find schedules that will execute quickly on the target system(s). However, the scheduler manipulates instructions whose operands are virtual—that is, not yet mapped to physical registers in the processor. The mapping of virtual registers to physical registers is performed by the register allocator.

In some schedules, however, the available registers may be used up at some point. Then, if a new free register is needed, the register allocator will have to store a register value in a memory (for example, by inserting a store instruction—a spill). Then, the register allocator must reload that value back when it is needed (for example, by inserting a load instruction—a reload) into the instruction stream. The insertion of such spills and reloads into the schedule carefully crafted earlier may result in a detrimental effect on the system performance. Therefore, the scheduler needs to be aware of the register pressure of the schedule that it has generated which will then become the input to the register allocator.

As discussed above,. There is a finite number of registers in a processor 5 architecture. For example, in UltraSPARC®-II and -III, there are 32 integer registers and 32 floating point registers. Since the number of available registers are limited, if all the registers are used at the same time (i.e., simultaneously), there may not be any available registers. Thus, when L2 caching is scheduled, the latency is longer such that the registers are required for a longer period of time.

The hypothetical machine model in accordance with the present invention is designed to address such constraints of previous as well as the current generation machines. By targeting the hypothetical machine model which is comparatively a more constraining and restrictive machine as compared to the different types of machines in consideration, it is possible to achieve the performance that is reasonable and acceptable for all of the different types of machines in consideration without being exposed to potential performance sacrifice.

Indeed, in accordance with one aspect of the present invention, it is possible to achieve simultaneous optimization of the compiler to generate code that would be compatible and acceptable for both UltraSPARC®-II and UltraSPARC®-III processors (or any two or multiple processors that are configured for different operating conditions from one another) without potentially sacrificing the performance on any given machine.

In particular, in accordance with the present invention, the rules of instructions scheduling for the machines of interest (for example, UltraSPARC®-II and UltraSPARC®-III) are first abstracted. From the abstraction, a hypothetical machine is generated that is the restrictive or constraining set of the actual machines modeled in the abstraction step. After generating the hypothetical machine, the restricted (or constrained) hypothetical machine is targeted rather than the actual machines modeled in the first step. Thereafter, conflicts, if any are resolved by modeling the performance impact and selecting the less damaging choice. In this manner, by creating a hypothetical machine model which incorporates the features of all target machines of interest which is more restrictive or constrained that the actual machines modeled after resolving any conflicts by modeling the performance impact and selecting the less damaging choice, it is possible to provide a compiler design to simultaneously optimize the code targeting multiple machines.

Various other modifications and alterations in the structure and method of operation of this invention will be apparent to those skilled in the art without departing from the scope and spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. A method of simultaneously optimizing code for at least two target machines, comprising:
abstracting a rule of instruction scheduling for each of said at least two target machines;
generating a hypothetical machine model of a hypothetical machine based on said rule of instruction scheduling for each of said at least two target machines, wherein a rule of instruction scheduling for said hypothetical machine is a restrictive set of said rule of instruction scheduling for each of said at least two target machines; and
optimizing code using said hypothetical machine model, said optimized code targeting said hypothetical machine, wherein said hypothetical machine model is capable of operating on each of said at least two target machines.

2. The method of claim 1 further including:
detecting a conflict between said rule of instruction scheduling for each of said at least two target machines; and
resolving said conflict.

3. The method of claim 2 wherein resolving said conflict includes selecting a less damaging option for said detected conflict.

4. The method of claim 2 wherein said detected conflict corresponds to an inherent conflict between said rule of instruction scheduling for each of said at least two target machines.

5. The method of claim 1 further including:
modeling each of said at least two target machines; and
retrieving scheduling information corresponding to each of said at least two target machines.

6. The method of claim 1 wherein said at least two target machines include an UltraSPARC-II configured to operate at a speed of 360 MHz and an UltraSPARC-III configured to operate at a speed of 600 MHz.

7. A method of simultaneously optimizing code for at least two target machines, comprising:
retrieving scheduling information corresponding to each of said at least two target machines;
abstracting a rule of instruction scheduling for each of said at least two target machines;
generating a hypothetical machine model of a hypothetical machine based on said rule of instruction scheduling for each of said at least two target machines, wherein a rule of instruction scheduling for said hypothetical machine is a restrictive set of said rule of instruction scheduling for each of said at least two target machines; and
optimizing code using said hypothetical machine model, said optimized code targeting said hypothetical machine, wherein said hypothetical machine model is capable of operating on each of said at least two target machines.

8. The method of claim 7 further including:
detecting a conflict between said rule of instruction scheduling for each of said at least two target machines; and
resolving said conflict.

9. The method of claim 8 wherein resolving said conflict includes selecting a less damaging option for said detected conflict.

10. The method of claim 8 wherein said detected conflict corresponds to an inherent conflict between said rule of instruction for each of said at least two target machines.

11. A computer apparatus for simultaneously optimizing code for at least two target machines, comprising:
means for abstracting a rule of instruction scheduling for each of said at least two target machines;
means for generating a hypothetical machine model of a hypothetical machine based on said rule of instruction scheduling for each of said at least two target machines, wherein a rule of instruction scheduling for said hypothetical machine is a restrictive set of said rule of instruction scheduling for each of said at least two target machines; and means for optimizing code using said hypothetical machine model, said optimized code targeting said hypothetical machine, wherein said hypothetical machine model is capable of operating on each of said at least two target machines.

12. The apparatus of claim 11 further including:

means for detecting a conflict between said rule of instruction scheduling for each of said at least two target machines; and means for resolving said conflict.

13. The apparatus of claim 12 wherein said resolving means includes means for selecting a less damaging option for said detected conflict.

14. The apparatus of claim 12 wherein said detected conflict corresponds to an inherent conflict between said rule of instruction scheduling for each of said at least two target machines.

15. The apparatus of claim 11 further including:

means for modeling each of said at least two target machines; and means for retrieving scheduling information corresponding to each of said at least two target machines.

16. A computer apparatus for simultaneously optimizing code for a plurality of target machines, comprising:

means for receiving scheduling information corresponding to each of said at least two target machines;

means for abstracting a rule of instruction scheduling for each of said at least two target machines;

means for generating a hypothetical machine model of a hypothetical machine based on said rule of instruction scheduling for each of said at least two target machines, wherein a rule of instruction scheduling for said hypothetical machine is a restrictive set of said rule of instruction scheduling for each of said at least two target machines; and means for optimizing code using said hypothetical machine model, said optimized code targeting said hypothetical machine, wherein said hypothetical machine model is capable of operating on each of said at least two target machines.

17. A computer apparatus for simultaneously optimizing code for a plurality of target machines, comprising:

means for modeling a plurality of target machines;

means for retrieving scheduling information corresponding to each of said plurality of target machines;

means for abstracting a rule of instruction scheduling for each of said plurality of target machines;

means for generating a hypothetical machine model of a hypothetical machine based on said rule of instruction scheduling for each of said at least two target machines, wherein a rule of instruction scheduling for said hypothetical machine is a restrictive set of said rule of instruction scheduling for each of said at least two target machines; and means for optimizing code using said hypothetical machine model, said optimized code targeting said hypothetical machine, wherein said hypothetical machine model is capable of operating on each of said at least two target machines;

means for detecting a conflict between said rule of instruction scheduling for each of said plurality of target machines; and means for resolving said conflict.

* * * * *